Feb. 7, 1967          J. AGUILERA          3,303,080
INDEX TAB ASSEMBLY AND METHOD OF USING SAME
Filed June 11, 1963
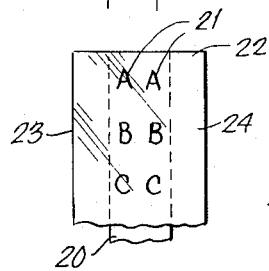
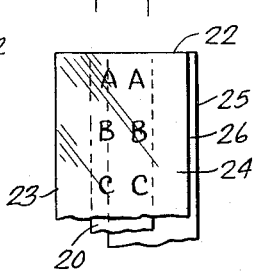
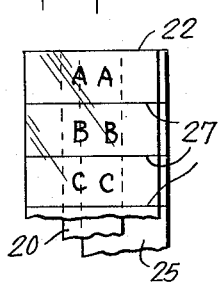
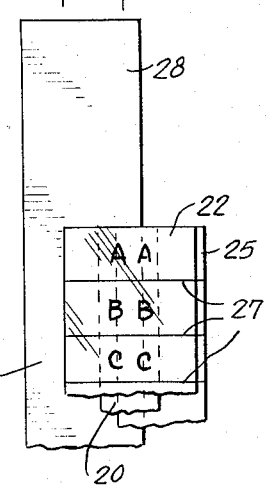
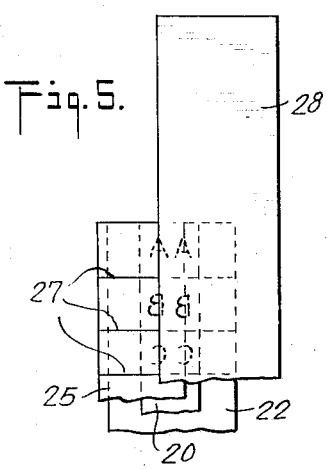
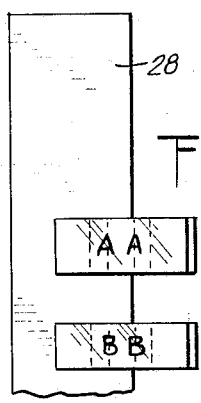
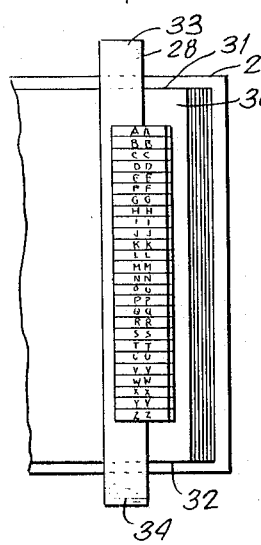
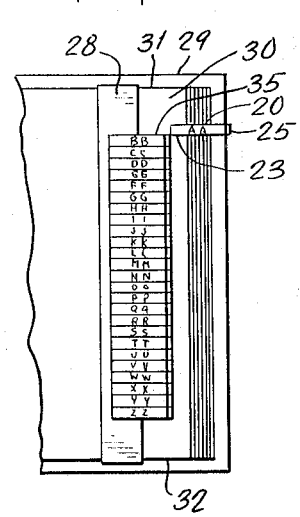
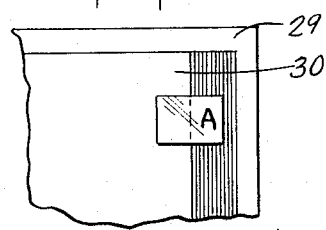
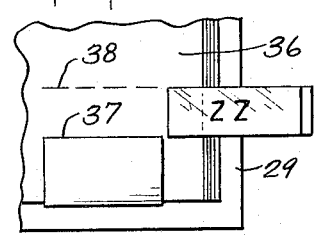
INVENTOR.
JORGE AGUILERA
BY Dayton R. Stemple, Jr.
ATTORNEY

United States Patent Office 3,303,080
Patented Feb. 7, 1967

3,303,080
INDEX TAB ASSEMBLY AND METHOD OF USING SAME
Jorge Aguilera, 204 W. 85th St., New York, N.Y. 10024
Filed June 11, 1963, Ser. No. 287,107
8 Claims. (Cl. 156—216)

This invention relates to index tabs and methods for their manufacture and application, and more particularly to a new and useful device for accurately positioning the individual index tabs along the free side of the associated pages with respect to the top and bottom and with respect to each other regardless of the book size.

Heretofore, index tabs have been sold in small boxes or packages, each box or package containing a complete set with each index tab completely cut and ready for attachment. The disadvantages of the foregoing method to both the vendor and purchaser are obvious. The vendor is presented with an onerous inspection problem to ensure that each set is complete, it is almost impossible to obtain uniformity throughout a set, and the purchaser is presented with the possibility of losing the use of an entire set because of the omission or loss of one index tab. In addition, the adhesive coatings on the index tabs are normally not pressure sensitive, but require the addition of a solvent such as water before attachment to a page.

These difficulties were partially solved by providing a mounting carrier to which an entire set of index tabs is removably attached, which minimized the danger of a broken set and ensured uniformity. However, the problem of accurately positioning the index tabs along the free side of a page with respect to the top and bottom and with respect to each other on other pages remained and has not heretofore been solved.

It is, therefore, an object of this invention to provide an index tab system for accurately positioning index tabs along the free side of a page with respect to the top and bottom and with respect to each other on other pages.

Another object of the invention is to provide an index tab system for accurately positioning index tabs along the free side of a page with respect to the top and bottom and with respect to each other without regard to the order in which the index tabs are applied.

Another object of the invention is to provide an index tab system in which the mounting carrier is also used as a guide for accurately positioning the index tabs along the free side of a page with respect to the top and bottom and with respect to each other.

Another object of the invention is to provide an index tab system with the foregoing objects in mind for applying index tabs having pressure sensitive adhesive coatings without the danger of fouling of the coatings.

Still further objects of the invention are to provide an index tab system with the foregoing objects in mind in which the system is easily manufactured and inexpensive, and the index tabs are rugged and easily applied.

It has been found that an ideal index tab system embodying the foregoing objects comprises in its preferred form the attachment of one leg of the index tabs to one side of a first strip longer than the length of the pages of the book to which the index tabs are to be applied and arranged in the same sequence and with the desired spacing from top to bottom as they would have when attached to the pages of the book. The strip is composed of a material such as cellophane which can be folded and from which the pressure sensitive adhesive coatings on the legs of the index tabs can be easily removed. The index tabs are attached to the strip in an open condition, that is to say, the legs of the index tabs lie in the same plane and the intermediate portions are twice as wide as the portions meant to extend beyond the sides of the pages to which they are to be attached. A second strip, also composed of a material from which the adhesive coatings can be easily removed such as cellophane, covers the adhesive coating on the other leg of each index tab.

To apply an index tab to a page, the first strip carrying the index tabs is placed lengthwise on the page to which the index tab is to be applied. The entire set of index tabs is placed on the page in the same position with respect to the top and bottom of the page as is desired for the index tabs to appear in the book. The top and bottom of the first strip are then folded over the top and bottom of the page to form a guide for subsequent application of index tabs to other pages.

The index tab is then removed and, using an adjacent index tab as a guide, is affixed to one face of the page. The intermediate portion is then folded in half, the second strip removed from the other leg of the index tab, and the other leg of the index tab affixed to the other face of the page thus completing the operation. If the index tab is the only or last one on the first strip, the strip must be cut or marked along the top or bottom of the index tab to serve as a guide for positioning.

With the above objects and features in view, the nature of which will become more apparent, the invention will be more fully understood by reference to the drawings, the accompanying detailed description, and the appended claims.

In the drawings:

FIG. 1 is a partial front plan view of a strip of open uncut index tabs;

FIG. 2 is a partial front plan view of the strip of FIG. 1 with a first strip of cellophane covering the adhesive coating on the right leg of the strip;

FIG. 3 is a partial front plan view of the strip of FIG. 2 with the individual index tabs cut;

FIG. 4 is a partial front plan view of the strip of FIG. 3 with the left legs of the index tabs attached to a second strip of cellophane;

FIG. 5 is a partial rear plan view of the assembly of FIG. 4;

FIG. 6 is a partial front plan view of the assembly of FIG. 4 with the index tabs spaced from rather than adjacent to each other;

FIG. 7 is a front plan view of the assembly of FIG. 4 placed on a page of a book;

FIG. 8 is a front plan view of the assembly of FIG. 7 with the ends of the second strip folded over the top and bottom respectively of the page and with the left leg of an index tab attached to the free side of a page;

FIG. 9 is a front plan view of a page with the attached index tab of FIG. 8 completely attached to a page; and FIG. 10 is a front plan view of the assembly of FIG. 7 showing a method for aligning the last index tab after all the index tabs have been removed from the second strip.

With reference to the drawings, the preferred embodiment of the invention is manufactured as shown in FIGS. 1 to 6. In FIG. 1, a strip of paper 20, twice as wide as is desired to extend from the free side of a page, is printed from top to bottom with pairs of characters 21 desired to be included in the set of index tabs. Paper strip 20 can be composed of any printable and foldable material. Characters 21 are illustrated by the alphabet although they can be any symbols which might be desired.

A strip of tape 22 such as cellophane tape as long as the paper strip 20 and twice or more as wide is centered on and placed over the paper strip 20 so that the pressure sensitive adhesive coating of the tape 22 adheres to the printed face of the paper strip 20. If it is desired that characters 21 on the paper strip 20 be added later, then of course the paper strip 20 must be bonded on the nonadhesive face of tape 22. It would not be as essential then that tape 22 be transparent, and any opaque material could suffice. In addition, tape 22 could be coated with any adhesive coating including those which require the addition of a solvent such as water before obtaining an adhesive quality. Also, it is possible that the paper strip 20 and the left and right ends 23 and 24 could be all one piece with the left and right ends 23 and 24 coated on one side with an adhesive coating.

In FIG. 2, a strip of cellophane 25 three-quarters or more the width of tape 22 has been placed on the adhesive coating on the underside of the right end 24 of tape 22. Cellophane is used for strip 25 because of its special qualities whereby a pressure sensitive adhesive coating on tape 22 can be easily removed therefrom. Any material composed of constituents from which the adhesive could be easily removed could be used in place of cellophane. Cellophane strip 25 can be colored to increase the attractiveness of the device. Cellophane strip 25 extends slightly beyond the edge of the right end 24 of tape 22 at 26 to ensure that all of the adhesive coating on the underside of the right end 24 of tape 22 is covered.

In FIG. 3, the characters 21 have been separated into individual opened index tabs A, B, C, etc. by cutting along the lines 27. In FIG. 4, the left ends 23 of the individual opened index tabs A, B, C, etc. have been affixed by their adhesive coatings to the cellophane strip 28 which like cellophane strip 25 is three-quarters or more the width of tape 22 and longer than the length of the pages to which it is contemplated that index tabs A, B, C, etc. will be attached. Like cellophane strip 25, cellophane strip 28 could be composed of any material having the properties necessary to facilitate the easy removal of the opened index tabs A, B, C, etc. without withholding much, if any, of the adhesive coating. In the preferred embodiment of the invention, cellophane strip 28 must be capable of being folded. To facilitate manufacture, the assembly of FIG. 2 could be directly attached to cellophane strip 28 and then the opened index tabs A, B, C, etc. separated by cutting along the lines 27. The latter method would obviate the necessity of individually attaching each of the opened individual index tabs A, B, C, etc. of FIG. 3 to cellophane strip 28. The only difference would be that cellophane strip 28 would also be partly cut through along the lines 27 thus requiring perhaps a wider margin 29 on cellophane strip 28.

FIG. 5 shows a partial rear plan view of the assembly of FIG. 4. Part of cellophane strip 25 extends between paper strip 20 and cellophane strip 28 although functionally such an arrangement is not necessary. FIG. 6 shows the opened individual index tabs A, B, C, etc. as in FIG. 4, but spaced from rather than adjacent to each other. In the embodiment of FIG. 6, the opened individual index tabs A, B, etc. must be cut as in FIG. 3 before attachment to cellophane strip 28. Cellophane strip 28 can be decorated if desired with any advertisement, instructions, or other printed matter.

In operation, FIGS. 7 to 10 show how the index tabs A, B, C, etc. are affixed to a book 29. In FIG. 7, the assembly of FIG. 4 is placed on page 30 of book 29. Cellophane strip 28 is positioned to that opened individual index tabs A, B, C, etc. are spaced as desired from the top 31 and bottom 32 of page 30.

In FIG. 8, the ends 33 and 34, shown in FIG. 7, of cellophane strip 28 are folded around the top 31 and bottom 32 respectively of page 30. Ends 33 and 34 can be folded under page 30, or folded under one or more pages, or simply creased so as to form a mark to place cellophane strip 28 on the same or a subsequent page so that opened individual index tabs A, B, C, etc. will always be the same distance from the top 31 and bottom 32 of page 30, or the top and bottom of any subsequent page. Of course, cellophane strip 28 can be pre-marked with a scale to obviate the folding operation.

In FIG. 8, opened index tab A has been peeled from cellophane strip 28 and its left end 23 affixed by its pressure sensitive adhesive coating to the free side of page 30. The upper edge 35 of opened index tab B served as a guide to position opened index tab A. Paper strip 20 of opened index tab A is then folded in half and cellophane strip 25 peeled from the right end 24 of index tab A. The right end 24 of index tab A is then affixed to the under face of page 30 and the resultant completed operation is shown in FIG. 9. By following the foregoing steps, fouling of the adhesive coatings on legs 23 and 24 is impossible.

FIG. 10 shows the operation necessary to apply the last opened index tab to page 36 of book 29. Since all the other opened index tabs have been removed from cellophane strip 28, there is nothing to serve as a guide for opened index tab Z. Therefore, cellophane strip 28 is cut at 37 so as to serve as a guide to correctly position opened index tab Z with respect to the top and bottom of page 36. Of course, any marking at 37 would serve the same purpose, as well as a mark at 38. The method of FIG. 10 must be used for every index tab A, B, etc. when spaced as in FIG. 6.

Thus, it can be seen that an index tab system has been devised which not only permits accurate location of each and every index tab A, B, C, etc. with respect to the top and bottom of any page and with respect to each other, but the same result can be accomplished no matter in which order the index tabs are applied. The device can be provided in any size to fit any book and the characters 21 can be subdivided to form two or more cascades of characters as long as ends 33 and 34 of cellophane strip 28 are at least as long as the length of the pages of the book on each cascade. In addition, characters can be cut out of or added to the set and cellophane strip 28 rejoined by simply taping the resultant two parts back together. Also, the index tab system lends itself readily to home manufacture because all of the materials are easily obtainable and no special tools are required. Thus all of the best features of the prior art are included in the invention and all of the deficiencies are overcome. Cellophane strip 28 serves not only as a means for obtaining uniformity in manufacture and as a mounting carrier, and as a motif for the display of advertising or other printed matter, but also serves as a guide to index a book with all of the index tabs in perfect alignment no matter what order they are placed in the book. In addition, cellophane strip 28 can be so designed as to serve as a bookmark after all of the index tabs A, B, C, etc. have been removed.

Although the invention has been described in its preferred form with a certain degree of particularity, it is understood that the present disclosure of the preferred form has been made by way of example and that numerous changes in the details of construction and the combination and arrangement of parts may be resorted to without departing from the spirit and the scope of the invention.

I claim:

1. An index tab assembly comprising a first strip of flexible material having duplicate columns of index characters formed on one fac thereof intermediate its edges, a transparent strip of flexible material adhesively secured to the indicia-containing face of said first strip and containing adhesively coated lateral edge portions extending beyond the edges thereof, a flexible backing strip releasably adhered to one lateral edge portion of said transparent strip and disposed thereneath and beneath at least a portion of said first strip, and a flexible combined mounting and guide strip releasably adhered to the other lateral edge portion of said transparent strip and disposed thereneath and beneath at least a portion of said first strip, said mounting and guide strip having a length greater than the length of the pages to which the index tabs are to be applied, said first, transparent and backing strips being slit along spaced parallel lines intermediate each successive pair of said duplicate index characters whereby to define a set of index tabs individually removable from said mounting strip and from the resulting cut sections of said backing strip.

2. The index tab assembly of claim 1 in which the adhesive on said transparent strip is a pressure-sensitive adhesive.

3. The index tab assembly of claim 1 in which said mounting and guide strip is provided with means for accurately positioning the entire set of index tabs with respect to the top or bottom edges of the pages to which individual tabs are to be secured whereby to permit said mounting and guide strip and each successive tab to serve as a positioning guide for each preceding tab.

4. The method of applying an index tab from the assembly of claim 1 which comprises, positioning and maintaining said assembly at a predetermined location on a page, peeling an index tab from said mounting and guide strip to expose the adhesive coating of one end of said tab, and attaching the exposed end of said tab to one face of said page at an edge thereof using said mounting strip and the next adjacent tab as guides so that said index tab is located substantially the same distance from the top and bottom of said page as it was when attached to said mounting strip when said mounting strip is maintained in position on said page.

5. The method of applying an index tab from the assembly of claim 1 which comprises, positioning said assembly at a predetermined location on a page, folding the ends of said mounting and guide strip over the top and bottom of said page to maintain said mounting and guide strip in position, peeling an index tab from said mounting and guide strip to expose the adhesive coating of one end of said tab, and attaching the exposed end of said tab to one face of said page at an edge thereof using said mounting strip and the next adjacent tab as guides so that said index tab is located substantially the same distance from the top and bottom of said page as it was when attached to said mounting strip when said mounting strip is positioned on said page by said folds.

6. The method of claim 5 additionally comprising, folding said tab in half toward the other face of said page and along a line intermediate said duplicate index characters, removing the cut section of said backing strip from the other end of said tab to expose the adhesive coating thereof, and attaching said other end of said tab to the other face of said page.

7. The method of claim 6 in which said mounting strip is first marked along one end of said tab to provide a visible guide for the proper positioning of said tab on said page.

8. The method of claim 6 in which all of the steps are repeated each time another tab is to be removed from said assembly for application to another said page.

References Cited by the Examiner
UNITED STATES PATENTS

| | | | |
|---|---|---|---|
| 2,262,400 | 11/1941 | Laws | 40—125 |
| 2,372,994 | 4/1945 | Welch | 156—249 X |
| 3,070,482 | 12/1962 | Cunningham | 161—406 X |
| 3,099,089 | 7/1963 | Bond et al. | 33—1 |

EARL M. BERGERT, *Primary Examiner.*

HAROLD ANSHER, *Examiner.*